United States Patent [19]
Sullivan

[11] 3,830,135
[45] Aug. 20, 1974

[54] MILLING MACHINE TOOL HOLDER

[76] Inventor: Francis Sullivan, 279 Venado, Thousand Oaks, Calif. 91366

[22] Filed: Jan. 31, 1972

[21] Appl. No.: 222,104

[52] U.S. Cl.................. 90/11 A, 279/53, 279/76
[51] Int. Cl. .................... B23c 5/26, B23b 31/04
[58] Field of Search ................. 279/53, 82, 76, 83; 408/240, 239 R, 239 A; 90/11 A

[56] References Cited
UNITED STATES PATENTS

| 732,048 | 6/1903 | Coburn | 408/239 A |
| 1,839,569 | 1/1932 | Lovejoy | 90/11 A |
| 2,337,400 | 12/1943 | Maute | 279/53 |
| 3,618,962 | 11/1971 | Cox et al. | 279/82 |

*Primary Examiner*—Gil Weidenfeld

[57] ABSTRACT

A tool holder for a rotary cutting apparatus including a collet with a lateral opening and an inert positioned within the opening. The insert has a flush top surface and a beveled bottom surface, the beveled bottom surface engaging a beveled surface in the shank of a tool.

5 Claims, 6 Drawing Figures

PATENTED AUG 20 1974 3,830,135
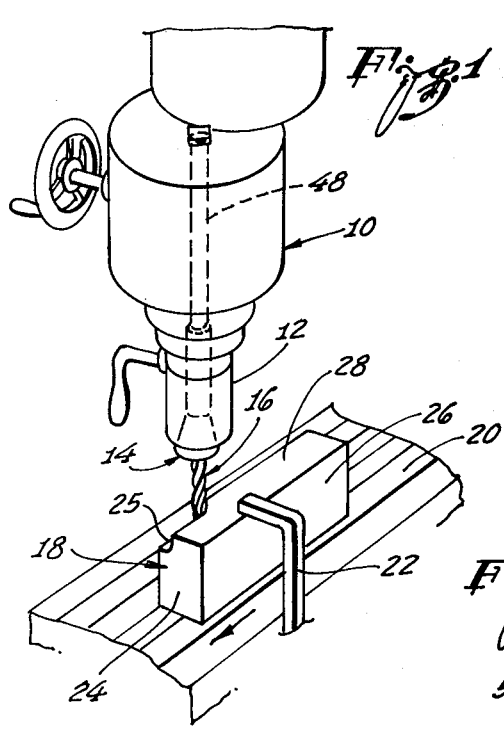
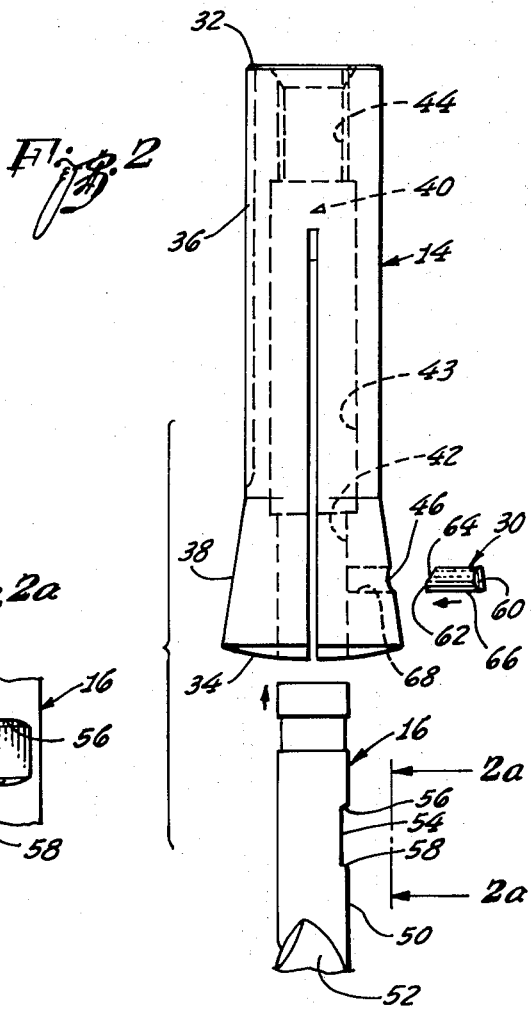
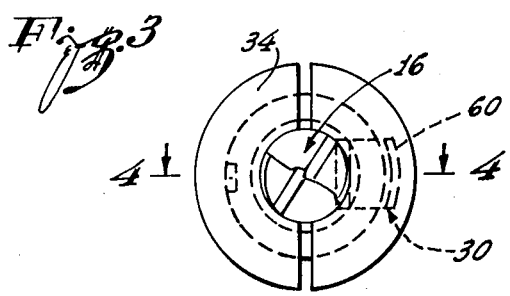
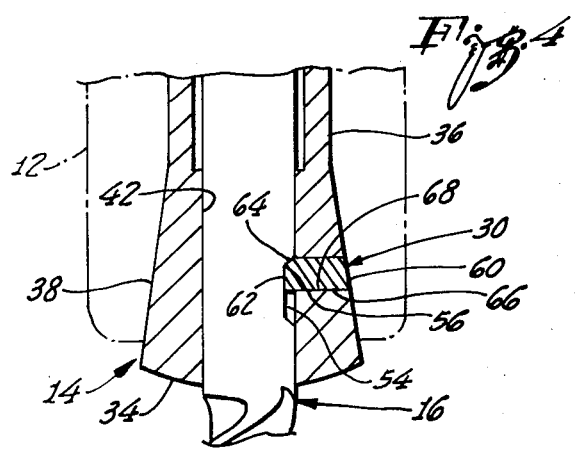
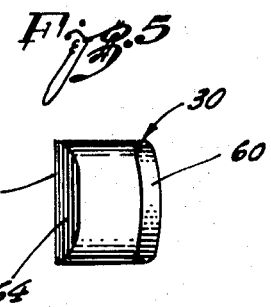

3,830,135

MILLING MACHINE TOOL HOLDER

BACKGROUND OF THE INVENTION

1. Field of the Invention:

The present invention relates to a tool holder and more particularly to a tool holder for a rotary cutting apparatus.

2. Description of the Prior Art:

A rotary cutting apparatus, such as a milling machine, uses a collet to hold a tool in place during the cutting or milling operation. One form of collet is comprised of a central aperture and has one end portion split into three sections with the outer surface of the end portion being tapered from a smaller diameter to a larger diameter. The central aperture receives the tool in a generally tight fitting arrangement. The collet is then inserted into a spindle of the cutting apparatus. The spindle has a complementary tapered inner surface to engage the tapered end of the collet so that the collet is squeezed; the squeezed collet retains the tool by the friction engagement between the tool and the three sections of the collet end.

During use the cutting edges of the tool become dulled; this in turn increases the cutting forces acting upon the tool causing the tool to be pulled from the collet. For example, in the usual arrangement of an end milling machine, the tool is suspended in a downwardly extending fashion to engage a work piece. The forces acting upon the tool tend to pull the tool downwardly slowly by causing it to rotate with a slow twisting motion. Since a cutting operation must be dimensionally exact, the slow downward motion of the tool causes the depth of cut to vary from a predetermined dimension, thereby necessitating the scrappage of the work piece. Since most of the work pieces are cast metal items, scrapping is extremely expensive.

SUMMARY OF THE INVENTION

The present invention solves the problem of poor tool retention by providing a tool holder comprising a collet having an outer surface partially cylindrical in shape and partially conical in shape, said conical portion having a taper increasing in diameter toward one end of said collet, said collet additionally having a central aperture and having the conical portion split into two sections; and a lateral opening within one of said two sections, said opening extending from the tapered outer surface of the conical portion to the central aperture, said opening adapted to receive a closely fitted insert. It is contemplated that the tool will have a flattened portion along its shank which will be engaged by an insert fitted into the lateral opening, thereby causing a positive retention and locking of the tool within the collet after the collet is received by a cutting apparatus spindle.

An object of the present invention is to provide a tool holder which will prevent a tool moving from a predetermined position.

Another object of the present invention is to provide a strengthened tool holder having a tool retention means.

Still another object of the present invention is to provide a tool holder which will lock a tool into a predetermined position.

Yet another object of the present invention is to provide a tool holder which is economical, reliable, and easily adaptable to existing rotary cutting machines.

BRIEF DESCRIPTION OF THE DRAWING

FIG. 1 is a partially broken away perspective view of an end milling machine, illustrating a tool cutting a work piece.

FIG. 2 is a partially broken away, exploded elevational view of a collet, tool, and insert.

FIG. 2a is a partial view of the tool shown in FIG. 2 as viewed along line 2a —2a of FIG. 2.

FIG. 3 is an end view of the collet, tool, and insert illustrated in FIG. 2.

FIG. 4 is an elevational sectional view taken through the line 4—4 of FIG. 3.

FIG. 5 is an elevational view of the insert.

DESCRIPTION OF THE EMBODIMENT

Referring to FIG. 1, there is illustrated an example of the environment in which the present invention may be used. There is illustrated a portion of a milling machine 10 having a spindle 12 into which a tool holder 14 is received. Depending in a downward direction is a tool, such as a rotary cutter 16, which is shown milling a work piece 18 clamped to the milling machine table 20 by a clamping device 22. In operation the milling machine portion 10 is stationary with the spindle 12, the holder 14, and the rotary cutting tool 16 rotating about an axis coincident with the longitudinal axis of the rotary cutting tool 16. The milling machine table is depicted as being movable generally from the right to the left so that the cutting tool begins cutting away the surface 24 of the work piece and continues to form a new surface 25, which is parallel to the surface 26.

Since milling machines are precise instruments, the depth of cut, that is, the distance below the top surface 28, which is to be cut away, can be very closely determined and programmed into the milling machine. In a like fashion, the distance which the rotary cutter will shorten the width dimension of the surface 24 may be precisely determined and programmed into the machine. As already mentioned, tools tend to become dull after being used, which in turn increases the cutting forces upon the tool. These cutting forces act generally in a downward direction, causing the tool to drop, thereby causing the dimension, as measured from the top surface 28, into the work piece to vary from the predetermined dimension. In addition, the newly cut surface may become marred if there is slippage of the cutting tool.

Referring now to FIGS. 2, 2a, 3, 4, and 5, there is illustrated in more detail the collet 14, the cutting tool 16, and the insert 30. The collet has two ends, an upper end 32 and a lower end 34. The outer surface of the collet is divided into two portions, a first portion 36 having a generally constant diameter cylindrical shape and a second portion 38 adjacent the end 34 which has a truncated conical shape with the tapered outer surface increasing in diameter from the diameter of the portion 36 toward the end 34. The collet has an elongated central aperture 40 which has three sections, a first section 42 extending from the end 34 about the length of the portion 38 and having a smooth bore, a central section 43 slightly enlarged from the section 42, and a third section 44 extending from the end 32 and having an internal thread. The collet is partially split into two sections with the split starting at the end 34 and extending through the portion 38 and into the portion 36. Within one of the split sections is a lateral opening 46 extending from the tapered outer surface in the portion 38 to the section 42 of the central aperture. As will be discussed hereinbelow, the central aperture, section 42, receives the tool 16, while the lateral opening 46 receives the insert 30.

The function of the section 44 of the central aperture is to receive an elongated threaded bolt 48, FIG. 1, which is used to lock the collet into the spindle of the milling machine. This is accomplished by inserting the collet 14 into an opening of the spindle 12 which has a surface complementing the outer surface of the collet. The elongated bolt 48 then is received by the threaded section 44 and conveniently tightened to secure the collet. In prior art tool holders tightening of the bolt 48 caused the surface of the opening in the spindle 12 to squeeze the three-sectioned collet to frictionally engage the tool. However, as already explained, the friction engagement has proven to be inadequate to prevent movement of the tool when the tool is exposed to excessive cutting forces.

The tool 16 is comprised of a shank portion 50 and a bit portion 52. Within the shank portion is a flattened area 54 having a width (transverse to the axis of the tool) greater than half the diameter of the shank and having beveled end surfaces 56 and 58. The beveled surfaces terminate the area in a longitudinal direction (that is, parallel to the longitudinal direction of the tool). Generally, the flattened portion 54 is formed in the tool to provide a location for marking the tool size and in some cases to indicate the tool manufacturer and a description of the tool characteristic.

The tool is received within the section 42 of the central aperture so that the flattened portion 54 aligns with the lateral opening 46. Once aligned, the insert 30 is received by the opening 46 in a close fitting relationship. The insert has two end surfaces, a top surface 60 and a bottom surface having a flat portion 62 and a beveled portion 64, FIGS. 2, 4, and 5. The flat portion 62 abuts or engages the flattened portion 54 of the tool, while the beveled portion 64 of the insert abuts the beveled surface 56 of the tool. In this fashion, as long as the insert is retained within the opening 46, the tool is locked within the collet since any force acting upon the bit portion 52 of the tool will be counteracted. Since the collet is rigidly retained by the bolt 48, the tool is locked and the slow dropping phenomenon of the prior art is eliminated.

The top surface 60 of the insert 30 is formed to be flush with the tapered surface of the portion 38 when the insert is in a locking position, as shown in FIG. 4. By having a flush top surface, the insert 30 is easily retained in position when the collet is located in the spindle by the interior surface of the spindle. As long as the insert is prevented from moving out of the opening 46 the tool will remain in a locked position. The width of the insert (which is identical to the length of the flat portion 62, FIG. 5, and perpendicular to the direction of the longitudinal axis of the collet) is made as large or larger than the width of the flattened area 54 of the tool. The depth of the insert (the dimension viewed in FIG. 4 and parallel to the direction of the longitudinal axis of the collet) is considerably smaller than the width and is made relatively small so that the area of the opening 46 can be made small. The smaller the opening, the stronger the collet. It is to be noted that the width of the insert will vary depending upon the size of tool used.

Any suitable material may be used for the collet and the insert, such as the steel presently being used for the prior art collets. It is to be understood that the present invention may be used with any rotary cutting machine where the tool is retained by a collet and is not to be limited in anyway to the particular milling machine illustrated herein. It is obvious that many modifications and variations of the present obvious that many modifications and variations of the present invention are possible in light of the above teaching. It is therefore to be understood that the invention may be practiced otherwise than as is specifically described herein.

As already described above, the prior art collets were retained within the opening of the spindle by the elongated bolt. Retention of the tool within the collet was accomplished by creating a friction engagement between the three sections of the collet and the tool. This friction engagement was engendered by the tight abutment of the tapered portion of the collet with the inner surface of the spindle. However, for various reasons, such as poor tolerances or damaged collets and spindles, there was not always an equal squeeze force transmitted from the inner surface of the spindle to the collet. When this occurred, the likelihood of the tool moving was greatly increased so that in addition to a tool being dislodged because of excessive cutting forces, even sharp tools were dislodged because the retention force applied by the collet was insufficient and/or not uniform. The present invention eliminates this problem entirely because the insert 30 locks the tool 16 in place. Once the collet is inserted into the spindle 12, the interior surface of the spindle functions to prevent the insert 30 from moving out of the lateral opening 46 rather than solely functioning to squeeze the collet. Thus, once the tool and insert are properly located within the collet and the collet is properly secured within the spindle by the bolt, there is no chance of the tool being moved.

As an additional advantage, the collet of the present invention is as strong, if not stronger, than the prior art collets because the collet 14 is split into two sections rather than the three sections of the prior art; it is understood that the larger the sections, the stronger the element (collet).

Still another advantage of the present invention is that it is an extremely economical improvement in that tools, such as the tool 16, are already manufactured with the flattened surface 54 and the beveled surfaces 56 and 58. The only added expense involves the formation of the lateral opening 46 and the production of the insert 30. However, this added cost will be more than offset by a reduction of the scrappage rate of work pieces and in a reduction of tool expenses since tool damage is reduced.

I claim:

1. A collet having an open end central aperture for receiving a tool shank, said shank having a recess with a flat bottom and a width greater than half the diameter of the shank and a transversely extending beveled shoulder on the upper side thereof, and wherein said collet comprises a substantially tubular body having a cylindrical inner wall and having a tapered outer surface on its lower portion with diametrically opposite slit means extending lengthwise thereof to provide two contractible segments, the lower portion of one of the segments having an opening intermediate the axial ends thereof which radially extends from the tapered outer surface to the cylindrical inner wall; a locking insert disposed within said opening and having a close sliding fit therewith, said insert having a length substantially equal to the depth of the radial opening in said collet plus the depth of the recess in said tool shank, one end of said insert having a smooth tapered surface conforming to the tapered outer surface of said body, and the other end of said insert having a flat surface of breadth substantially equal to the width of the flat bottom of said recess for engagement therewith and having an adjacent surface complementary to the beveled shoulder on the upper side of said tool shank for mating therewith.

2. A tool holder for receiving a tool shank having a recess with a flat bottom and a width greater than half the diameter of the shank and a transversely extending beveled shoulder on the upper side thereof, said tool holder including a spindle means having a central bore with a tapered inner surface on its lower end, a collet having an open end central aperture and a substantially tubular body with a tapered outer surface on its lower portion including diametrically opposite slit means extending lengthwise along the diameter thereof to provide two circumferential segments, the lower portion of said collet being arranged to be radially contracted when the collet is drawn into the central bore of said spindle means, and drawing means on said spindle means for axially drawing said collet into the central bore thereof, the lower portion of one of the segments on said collet having a substantially rectangular opening intermediate the axial ends thereof which extends radially from the tapered outer surface to the central aperture thereof, and the longer dimension of said rectangular opening being normal to the longitudinal axis of said collet, said insert having a length substantially equal to the depth of the radial opening in said collet plus the depth of the recess in said tool shank, said insert having a flat inner end surface of breadth substantially equal to the width of the flat bottom of said recess and having an adjacent surface complementary to the beveled shoulder on the upper side of said tool shank, said insert having a smooth continuous outer end surface conforming with the tapered outer surface of the collet which contacts the wall of the bore of said spindle means, and the flat inner end surface of the insert being adapted to be fully seated in said recess with its adjacent edge against the beveled shoulder thereof when the collet is drawn up into said spindle means by said drawing means to thereby prevent the withdrawal of the tool.

3. An accessory according to claim 1 wherein said insert has a substantially rectangular cross sectional shape with the long dimension adapted to extend at a right angle to the axis of the collet.

4. An accessory according to claim 3 wherein said insert has a substantially flat face extending throughout the side adapted to face the open end of the collet.

5. An accessory according to claim 4 wherein said insert has a rounded wall on the side opposite the flat face extending from one end edge of the flat face to the other end edge.

* * * * *